(12) United States Patent
Mutlu

(10) Patent No.: US 12,534,046 B2
(45) Date of Patent: Jan. 27, 2026

(54) METHOD FOR ACTUATING AN ACCESS SYSTEM OF A MOTOR VEHICLE, APPARATUS FOR PERFORMING THE METHOD, AND MOTOR VEHICLE HAVING SUCH AN APPARATUS

(71) Applicant: MERCEDES-BENZ GROUP AG, Stuttgart (DE)

(72) Inventor: Özgür Mutlu, Stuttgart (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 0 days.

(21) Appl. No.: 18/832,722

(22) PCT Filed: Dec. 6, 2022

(86) PCT No.: PCT/EP2022/084562
§ 371 (c)(1),
(2) Date: Jul. 24, 2024

(87) PCT Pub. No.: WO2023/143789
PCT Pub. Date: Aug. 3, 2023

(65) Prior Publication Data
US 2025/0100509 A1    Mar. 27, 2025

(30) Foreign Application Priority Data
Jan. 25, 2022   (DE) .................... 10 2022 000 256.6

(51) Int. Cl.
*E05B 81/78*    (2014.01)
*B60R 25/30*    (2013.01)
(Continued)

(52) U.S. Cl.
CPC ............ *B60R 25/305* (2013.01); *B60R 25/31* (2013.01); *G06V 20/58* (2022.01); *G06V 40/10* (2022.01); *G06V 10/44* (2022.01); *G06V 40/25* (2022.01)

(58) Field of Classification Search
CPC .. G07C 2209/64; G07C 9/00309; G07C 9/00; G06V 20/58; G06V 40/10; G06V 40/107;
(Continued)

(56) References Cited

U.S. PATENT DOCUMENTS

| 9,689,982 B2 | 6/2017 | Herthan |
| 2008/0221730 A1* | 9/2008 | Sakata .................. G06N 3/004 700/245 |

(Continued)

FOREIGN PATENT DOCUMENTS

| CN | 210466502 U | 5/2020 |
| CN | 111616715 A | 9/2020 |

(Continued)

OTHER PUBLICATIONS

International Search Report and Written Opinion mailed Apr. 11, 2023 in related/corresponding International Application No. PCT/EP2022/084562.

(Continued)

*Primary Examiner* — Dionne Pendleton
(74) *Attorney, Agent, or Firm* — PATENT PORTFOLIO BUILDERS PLLC

(57) ABSTRACT

A method for actuating an access system of a motor vehicle involves a camera arrangement detecting at least one foot of a person. An orientation of the foot is determined and based on the determined orientation, a line of sight of the person is then determined. When the line of sight is directed towards at least one tailgate and/or door of the motor vehicle, at least one tailgate and/or door is unlocked and/or (Continued)

automatically actuated to open by the access system. When, however, the line of sight is not directed towards at least one tailgate and/or door, tailgates and/or doors are locked and/or automatically actuated to close by the access system.

11 Claims, 1 Drawing Sheet

(51) Int. Cl.
  *B60R 25/31*  (2013.01)
  *G06T 7/70*  (2017.01)
  *G06V 20/58*  (2022.01)
  *G06V 40/10*  (2022.01)
  *G06V 10/44*  (2022.01)
  *G06V 40/20*  (2022.01)

(58) Field of Classification Search
  CPC .... G06V 40/19; G06V 40/28; E05Y 2400/00; E05Y 2400/456; E05Y 2400/858; E05Y 2900/531; E05Y 2900/546; E05Y 2400/45; E05Y 2400/53; E05Y 2900/532; E05Y 2900/548; E05Y 2400/44; E05F 15/73; E05F 2015/767; E05F 15/40; B60R 25/305; B60R 25/31; B60R 11/04; B60R 2011/0043; B60R 25/10; B60R 25/20; B60Q 1/0023; G08G 1/096716; G08G 1/096725; G08C 2201/32; G06T 19/006; G06T 2207/10028; G06T 7/74; G06Q 30/0643; G06F 3/013; G06F 3/017; G01S 13/0209; G01S 13/88; G01S 13/931; G01S 2013/93272; G01S 2013/93273; G01S 2013/93275; G01S 2013/93277; G01S 7/41; G01S 7/415; E05B 81/76; E05B 83/16; B60W 2540/041; B60W 50/0098; B60W 60/0025

See application file for complete search history.

(56) References Cited

U.S. PATENT DOCUMENTS

| | | | |
|---|---|---|---|
| 2015/0199816 A1* | 7/2015 | Freeman | G06T 7/74 382/103 |
| 2017/0328116 A1 | 11/2017 | Herthan | |
| 2018/0137346 A1* | 5/2018 | Mori | G06V 40/20 |
| 2018/0234797 A1* | 8/2018 | Ledvina | G07C 9/29 |
| 2019/0263422 A1 | 8/2019 | Enthaler et al. | |
| 2022/0266796 A1* | 8/2022 | Peterson | B60Q 1/323 |

FOREIGN PATENT DOCUMENTS

| | | |
|---|---|---|
| CN | 111738235 A | 10/2020 |
| DE | 102013010993 A1 | 1/2015 |
| DE | 102016108702 A1 | 11/2017 |
| DE | 102018005293 A1 | 1/2020 |
| DE | 202019104268 U1 | 11/2020 |
| DE | 102019209300 A1 | 12/2020 |
| JP | 2019173508 A | 10/2019 |
| JP | 2021156154 A | 10/2021 |
| KR | 101954199 B1 | 5/2019 |
| WO | 2018100925 A1 | 6/2018 |

OTHER PUBLICATIONS

International Search Report and Written Opinion mailed Mar. 15, 2023 in related/corresponding International Application No. PCT/EP2022/084382.

Office Action created Aug. 2, 2022 in related/corresponding DE Application No. 10 2022 000 256.6.

Office Action dated May 28, 2025 in related/corresponding KR Application No. 10-2024-7024964.

Office Action dated Jul. 8, 2025 in related/corresponding JP Application No. 2024-543588.

* cited by examiner

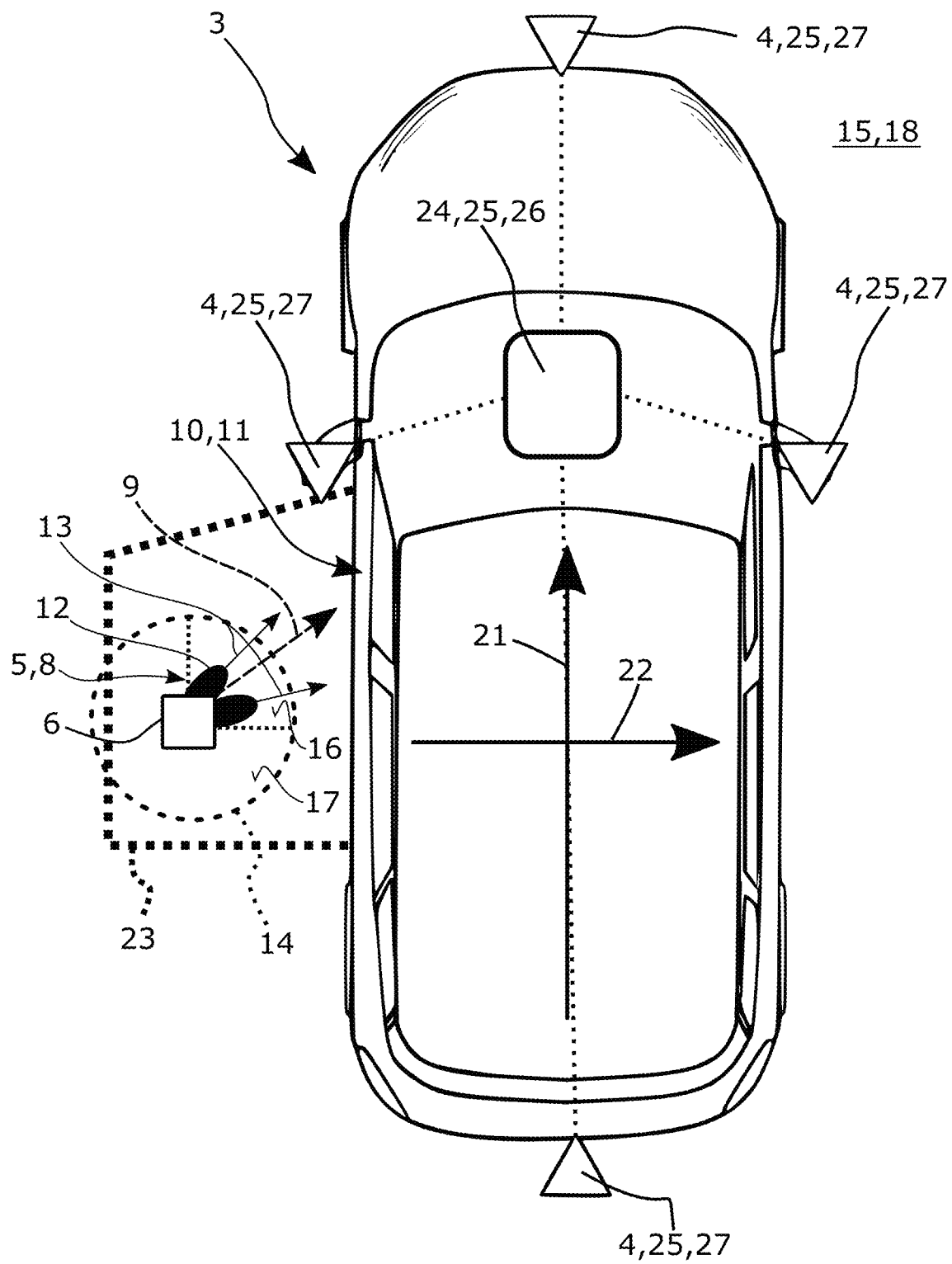

METHOD FOR ACTUATING AN ACCESS SYSTEM OF A MOTOR VEHICLE, APPARATUS FOR PERFORMING THE METHOD, AND MOTOR VEHICLE HAVING SUCH AN APPARATUS

BACKGROUND AND SUMMARY OF THE INVENTION

Exemplary embodiments of the invention relate to a method for actuating an access system of a motor vehicle, to an apparatus for performing the method, and a motor vehicle having such an apparatus.

A method of the aforementioned type is described in DE 20 2019 104 268 U1. Accordingly, an orientation of the feet of a person can be used in order to actuate an access system for locking and unlocking and/or automatically actuating tailgates and/or doors of a motor vehicle. A disadvantage of this is that the orientation of the feet cannot be reliably used to evaluate whether the person actually seeks access to the motor vehicle, which can result in incorrect actuation of the access system.

A further method for actuating an access system of a motor vehicle is known from DE 10 2016 108 702 A1.

Exemplary embodiments of the invention are directed to an improved or at least another embodiment of a method for actuating an access system of a motor vehicle. In particular, it attempts to provide a method with which manual interaction with the motor vehicle is not necessary for locking and unlocking and/or automatically actuating tailgates and/or doors of a motor vehicle.

The fundamental idea of the invention is to actuate an access system for locking and unlocking and/or automatically actuating tailgates and/or doors of a motor vehicle, depending on a determined line of sight of a person.

According to the invention, a method for actuating an access system of a motor vehicle is provided for this purpose, in the course of which, by means of a camera arrangement of the motor vehicle, at least one foot of a person approaching the motor vehicle or located at the same is detected, then by means of a software tool, an orientation of the at least one foot detected by the camera arrangement is initially determined and, based on the determined orientation, a line of sight of the person is then determined. By means of the access system for locking and unlocking and/or automatically actuating tailgates and/or doors of the motor vehicle, at least one tailgate and/or door of the motor vehicle is unlocked and/or automatically actuated to open when the determined line of sight is directed, in particular substantially or exactly, towards the respective at least one tailgate and/or door. Furthermore, by means of the access system, at least one tailgate and/or door of the motor vehicle is locked and/or automatically actuated to close when the determined line of sight is not directed, in particular substantially or exactly, towards the respective at least one tailgate and/or door. The method according to the invention enables the access system of the motor vehicle to be actuated by the person without contact and thus tailgates and/or doors to be unlocked and locked by the person merely directing their sight towards a tailgate or door when approaching the motor vehicle. The person can therefore gain access to the motor vehicle or to storage spaces of the motor vehicle covered by tailgates relatively quickly and conveniently. Additionally, it can be reliably evaluated using the determined line of sight whether the person seeks access to the motor vehicle or not, whereby incorrect actuation of the access system is practically excluded. Since the person does not or practically does not have to actively interact with the motor vehicle, there is still advantageously time to deal with other things, so that the comfort experience achieved by the motor vehicle can be enhanced.

The person approaching the motor vehicle is expediently a user of the motor vehicle who is authorized to use the motor vehicle. The authorization may be granted to the person, in particular, for a limited time period or permanently. The authorization of the person can be actively checked in the course of the method described above, in particular using communication with a mobile end device carried by the authorized user, which, for example, can be realized by a so-called intelligent key (smart key) or a mobile phone (smart phone) or a so-called CoD, i.e., a smart device in the possession of the user of the motor vehicle (consumer owned smart device).

The term "foot" in the meaning of the invention is expediently the lowest section of a leg of a person. In particular, a foot has a tarsus directly adjacent to a lower section of the leg, a metatarsus adjoining the tarsus, and distal toes arranged on the metatarsus.

Expediently, it is provided in the scope of determining the orientation of the at least one foot detected by the camera arrangement that the toe of the foot is determined. In this context, it can also be provided that the determined line of sight is aligned parallel or substantially parallel to a toe vector at least extending through the determined toe of the detected foot. Expediently, the toe vector can further extend through a tarsus of the detected foot or through a lower section of a leg of the person. Therefore, the toe vector and the line of sight of the person can be determined relatively simply using the determined foot.

The toes and/or metatarsus of a foot of a person may expediently define a toe in the meaning of the invention.

According to the invention, it is further provided that by means of the software tool, an at least two-class classification object, in particular a classification circle, travelling in real time with the person is provided for classification of the determined line of sight. The classification object is expediently realized by a classification circle that can be aligned horizontally, in particular in relation to a ground on which the motor vehicle is arranged. Furthermore, it can be provided that the person is continuously centered in relation to the travelling classification circle. The classification object or the classification circle therefore realizes a software-generated tool for quickly and reliably classifying the determined line of sight of the person in real time.

According to the invention, it is further provided that the classification object, in particular the classification circle, is divided into a first class range facing towards a tailgate and/or a door of the motor vehicle and a second class range facing away in relation to this tailgate and/or this door of the motor vehicle, wherein, by means of the access system, this tailgate and/or this door of the motor vehicle is unlocked and/or automatically actuated to open when the determined line of sight lies, in particular substantially or exactly, inside of the first class range of the classification circle and wherein, by means of the access system, this tailgate and/or this door of the motor vehicle is locked and/or automatically actuated to close when the determined line of sight lies inside the second class range of the classification circle. In other words, the determined lines of sight lying inside of the first class range of the classification object, in particular of the classification circle, form approvals for unlocking and/or automatically actuating the opening of the respective tailgate or door of the motor vehicle, whilst the determined lines of sight not lying inside of the first class range of the classification circle form approvals for locking and/or automatically actuating the closing of the respective tailgate or door of the motor vehicle. Accordingly, the first class range could be referred to as an approval range and the second class range could be referred to as a locking range.

Expediently, the method can be characterized by the fact that the first class range, viewed in particular in a horizontal plane, spans an angle of at least 10° to at most 180°, in particular an angle of at least 30° and/or an angle of at most 90°. Furthermore, the second class range, similarly expediently viewed in a horizontal plane, can span an opposite angle, which is complementary in relation to the angle spanned by the first class range. Alternatively, the second class range, viewed in a horizontal plane, can span an angle of at least 180° to at most 350°, in particular an angle of at least 330° and/or an angle of at most 270°. In other words, the first class range spans an angle of at least 10° to at most 180°, in particular an angle of at least 30° and/or at most 90°, in a horizontal plane between its opposing range boundaries. The second class range can either be designed complementary in relation to this angle or span a predetermined angle of at least 180° to at most 350°, in particular an angle of at least 330° and/or an angle of at most 270°. In practice, due to the relatively large angular widths of the first or second class ranges, it can be determined relatively reliably and quickly whether the determined line of sight lies within the first or second class range. A classification object designed accordingly, in particular a classification circle, can therefore ensure a method that is relatively robust in terms of malfunctions when detecting the foot and of determination uncertainties when determining the orientation.

The horizontal plane can expediently be spanned by a central longitudinal axis of the motor vehicle and a transverse axis perpendicular to the latter. The horizontal plane can expediently be aligned parallel to a ground on which the motor vehicle is arranged.

It is understood that the classification object, in particular the classification circle, can be provided with more than two class ranges, for example a third class range separating the first class range from the second class range can be provided, wherein, if the determined line of sight lies within the third class range, further vehicle functions such as comfort functions can be activated automatically.

Furthermore, it can be provided that by means of the software tool, a control field, in particular directly bordering the respective tailgate and/or door, in particular designed to be two-dimensionally flat and in particular also aligned horizontally, is provided for each tailgate and/or door of the motor vehicle, whereby the access system is expediently transferred into a locked state, in which it is not possible to actuate the access system independently of the determined line of sight, if the person is not located inside the control field, and wherein the access system is expediently transferred into a released state, in which it is possible to actuate the access system depending on the determined line of sight, if the person is located inside the control field. Therefore, a backup function is specified that then only allows locking and unlocking and/or automatic actuation of the tailgates and/or doors of the motor vehicle when the person is actually located at the motor vehicle.

Further expediently, it can be provided that the software tool is provided in a computing unit of the motor vehicle. In this case, the software tool can preferably be realized by methods of computer-based vision or machine vision and/or by algorithms for detecting and measuring geometric structures of objects and their movements. Therefore, the software tool is implemented on the motor vehicle so that the proposed method can be completely performed on the or by the motor vehicle. In principle, however, it is also possible to outsource the software tool to an external location and implement it on a stationary server, for example, whereby communication between the external location and the motor vehicle can take place via radio communication in order to perform the proposed method. Furthermore, the image data, detected by means of the camera arrangement is analyzed relatively efficiently by the proposed methods, so that at least one foot and/or one toe of a person approaching the motor vehicle or located at the latter can be detected relatively quickly and in particular in real time. Expediently, a posture and/or position of a person can additionally be determined by means of computer-based vision.

The method can also be characterized by the fact that the software tool and/or the algorithms for detecting and measuring geometric structures of objects and their movements are trained by means of so-called ground truth data and/or by means of machine learning methods. In this case, the ground truth data can be determined in the course of learning runs of the method, performed for example by the manufacturer, on the motor vehicle. In this case, in particular machine learning methods such as "deep learning" can be used. The so-called ground truth data expediently represents data determined in the course of learning runs of the method, performed for example by the manufacturer, on the motor vehicle. The learning runs carried out expediently cover as broad a spectrum of conceivable practical scenarios as possible. In particular, learning runs can be carried out for all tailgates and/or doors of the motor vehicle, wherein it is used with test people with varying body types, different clothes and/or trajectories, and different environmental and weather conditions and time and lighting conditions are simulated. The collected ground truth data can therefore contribute to training the software tool and/or the said algorithms and make them relatively robust.

According to the method, it is expediently also provided that the detected ground truth data can be revised in the course of an adaptation process, wherein optionally the detected ground truth data can be expanded manually with attributes of the person. Such attributes can, for example, be formed by bounding boxes, track IDs or postures. For example, the software tool and/or the algorithm can be trained after the adaptation process has been carried out.

The software tool and/or the algorithm can expediently deliver data which comprises the location of the said person, their movement direction, their movement speed and their orientation.

A further fundamental idea of the invention is to specify an apparatus, mountable in particular on a motor vehicle, for performing the method described above. This apparatus set up to perform the method described above has a camera arrangement mountable or mounted on the motor vehicle, a computing unit, mountable or mounted on the motor vehicle, which is set up to perform computing operations and to control an access system for locking and unlocking and/or automatically actuating tailgates and/or doors of the motor vehicle and which is communicatively connected to the camera arrangement, and a computer-readable storage medium communicating with the computing unit or formed by the computing unit, wherein the latter comprises, in particular, instructions which, when performed by the computing unit, causes the proposed apparatus to perform the method according to the description above. Therefore, a favorable embodiment for an apparatus for performing the method described above is specified.

In this context it may be expedient if the camera arrangement is realized by at least one all-round visibility camera mountable or mounted on the motor vehicle. For example, there may be exactly four all-round visibility cameras arranged on the motor vehicle. Expediently, a 360° all-round view around the motor vehicle can be provided by means of such an all-round visibility camera. An all-round visibility camera can, in particular, also be formed by a so-called SVC camera or by an all-round visibility parking camera set up for carrying out park assistant functions. By means of this all-round visibility parking camera or SVC camera (surround vision camera, aka SVC), expediently a 360° all-round view around the motor vehicle can similarly be provided. Further expediently, four all-round visibility cameras are arranged on the motor vehicle, in particular one in the region of a front bumper, another in the region of a rear bumper and one each in the region of an A pillar of the motor vehicle or of a wing mirror of the motor vehicle.

In particular, it can be provided that at least one all-round visibility camera is aligned so that its field of vision center axis passing centrally through the respective field of vision is aligned diagonally with respect to a central longitudinal axis of the motor vehicle and in the direction towards a ground on which the motor vehicle is arranged. In other words, the at least one all-round visibility camera is expediently set up so that its field of vision is inclined downwards toward the ground. Therefore, the at least one all-round visibility camera can in particular detect obstacles on the ground located in proximity to the motor vehicle and feet and/or legs of a person located at the motor vehicle or moving towards the latter. The invention understands the term "field of vision" to mean in particular that three-dimensional area of an optical apparatus within which it can detect bodies.

A further fundamental idea of the invention is to specify a motor vehicle which can perform the method described above. To this end, a motor vehicle is provided which is equipped with an apparatus according to the preceding description, which is set up to perform the method according to the preceding description. This provides a preferred embodiment for a motor vehicle for performing the method described above.

To summarize, the following should be noted: The invention expediently relates to a method for actuating an access system of a motor vehicle, wherein, by means of a camera arrangement, at least one foot of a person is detected, by means of a software tool, an orientation of the foot is determined and, based on the determined orientation, a line of sight of the person is then determined. When the line of sight is directed towards at least one tailgate and/or door of the motor vehicle, at least one tailgate and/or door is unlocked and/or automatically actuated to open by means of the access system. When, however, the line of sight is not directed towards at least one tailgate and/or door, tailgates and/or doors are locked and/or automatically actuated to close by means of the access system. The invention, in particular, relates to an apparatus for performing the said method and expediently to a motor vehicle having such an apparatus.

Further important features and advantages of the invention result from the dependent claims, the drawings and the associated figure description given with reference to the drawings.

It is understood that the aforementioned features and the features still to be explained in the following can not only be used in the respectively specified combination, but also in other combinations or in isolation without leaving the scope of the present invention.

A preferred embodiment of the invention is presented in the drawing and is explained in more detail in the following description, wherein the same reference signs refer to identical or similar or functionally identical components.

BRIEF DESCRIPTION OF THE SOLE DRAWING

Here:

The sole drawing figure schematically shows a motor vehicle having an apparatus for performing the method according to the invention in a simplified representation, in a plan view.

DETAILED DESCRIPTION

The sole drawing figures shows a motor vehicle, referred to in its entirety with the reference numeral 3, in a plan view. It has tailgates and doors 11 that can be actuated by means of an access system 10 integrated in the motor vehicle 3 for locking and unlocking and/or automatically actuating the tailgates and doors 11. This means that the tailgates and doors 11 can usually be either unlocked and/or automatically actuated to open or locked and/or automatically actuated to close by means of the access system 10.

To facilitate access to the motor vehicle 3 for a person 6, indicated here by a box, who is authorized to use the motor vehicle 3, in particular to make this access relatively quick and in particular without the need to manually touch the motor vehicle 3, the motor vehicle 3 is equipped, by way of example, with an apparatus 25 set up to perform the method according to the invention. By way of example only, this has four separate all-round visibility cameras 27 of a camera arrangement 4, indicated by triangles, a computing unit 24 installed in the motor vehicle 3 and indicated by a box, and a computer-readable storage medium 26 integrated in the computing unit 24.

The four all-round visibility cameras 27 realize, by way of example, together a 360° all-round view around the motor vehicle 3 so that in principle they are also suitable for carrying out park assistant functions of the motor vehicle 3. By way of example, an all-round visibility camera 27 is arranged in the region of a front bumper of the motor vehicle 3, another all-round visibility camera 27 is arranged in the region of a rear bumper of the motor vehicle 3 and one all-round visibility camera 27 each is arranged in the region of an A-pillar of the motor vehicle 3. Expediently, it can be provided that the all-round visibility cameras 27 are aligned in such a way that their field of view center axes, which pass centrally through the respective field of vision, are aligned diagonally with respect to a central longitudinal axis 21 of the motor vehicle 3 and in the direction towards a ground 15 on which the motor vehicle 3 is arranged. This results, so to speak, in a camera view downwards at an angle onto the ground 15, so that they can detect, in particular, obstacles on the ground in the proximity of the motor vehicle 3 as well as the feet 5 and/or legs of the person 6 located at the motor vehicle 3 or moving towards the same.

The mentioned computing unit 24 is set up to perform computing operations and to control the access system 10. For this purpose, it is communicatively connected to the all-round visibility cameras 27 of the camera arrangement 4 via communication lines marked by lines in the sole drawing figure. The storage medium 26 is integrated into the computing unit 24 in the present case and comprises instructions to be performed by the computing unit 24 which, when performed by the computing unit 24, causes the apparatus 25 to perform the method according to the invention.

According to the method according to the invention, it is provided by way of example that by means of the all-round visibility camera 27 of the camera arrangement 4, at least one toe 12 of a foot 5 of a person 6 approaching the motor vehicle 3 or located at the same is detected, wherein by means of a software tool (not shown) initially an orientation 8 of the at least one foot 5 or the toe 12 is determined and based on the determined orientation 8, a line of sight 9 of the person 6 is then derived. As an example, this can be based on the consideration that the sought line of sight 9 of the person 6 to be determined can be aligned parallel or at least substantially parallel to a toe vector 13 running at least through the determined toe 12. Subsequently, it is checked whether the determined line of sight 9 is directed towards a tailgate and/or door 11. If this is the case, by means of the access system 10, at least this tailgate and/or door 11 of the motor vehicle 3 is unlocked and/or automatically actuated to open. If, however, the determined line of sight 9 is not directed towards this tailgate and/or door 11, at least this one tailgate and/or door 11 is locked and/or automatically actuated to close by means of the access system 10. The method according to the invention thereby enables the access system 10 to be able to be actuated by the person 6 without contact so that tailgates and/or doors 11 can be unlocked or locked by the person 6 merely directing their sight towards a tailgate or door 11.

In order to simplify the check to be carried out as to whether the determined line of sight 9 is directed towards a tailgate and/or door 11 of the motor vehicle 3 and to make it robust against faults, it can be provided that, by means of the software tool, a classification object carried with the person 6 in real time is provided, which is realized by a classification circle 14, marked by means of a dotted line in the sole drawing figure, for classification of the determined line of sight 9, according to the present exemplary embodiment. The classification circle 14 is aligned by way of example horizontally in relation to the ground 15. Furthermore, it is provided that the travelling classification circle 14 is continuously centered in relation to the person 6. Using the sole drawing figure, it can also be seen that the classification circle 14 is formed of two classes, in that it is divided into a first class range 16, facing towards a tailgate and/or door 11 of the motor vehicle 3, and a second class range 17, facing away in relation to this tailgate and/or this door 11 of the motor vehicle 3. The first class range 16 spans an angle of 90° by way of example, between its range boundaries. The complementarily designed second class range 17 describes an angle of 270° between its range boundaries. An actuation of the access system 10 now takes place in the sense that, by means of the access system 10, a tailgate and/or door 11 is unlocked and/or automatically actuated to open when the determined line of sight 9 lies within the first class range 16 of the classification circle 14, and that, by means of the access system 10, this tailgate and/or door 11 is locked and/or automatically actuated to close when the determined line of sight 9 is not within the first class range 16, i.e., lies in particular within the second class range 17 of the classification circle 14.

Furthermore, in FIG. 1, a control field 23, marked with a dashed line and assigned to a tailgate and/or door 11, is specified, by means of which a specified distance between the motor vehicle 3 and a person 6 can be checked by expediently transferring the access system 10 into a locked state, in which it is not possible to actuate the access system 10 independently of the determined line of sight 9 if the person 6 is not located inside the control field 23, and wherein the access system 10 is expediently transferred into a released state, in which it is possible to actuate the access system 10 depending on the determined line of sight 9 if the person 6 is located inside the control field 23. Therefore, a type of backup function is specified, by means of which locking and unlocking and/or automatic actuation of the tailgates and/or doors 11 of the motor vehicle 3 is then only possible when the said person 6 is actually located at the motor vehicle 3—namely at a specified or specifiable distance to the motor vehicle 3.

Where the above refers to a horizontal alignment, this refers in particular to a horizontal plane 18, which is suitably spanned by the central longitudinal axis 21 and a transverse axis 22 perpendicular to the same. The horizontal plane 18 is aligned by way of example parallel to the ground 15.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:
1. A motor vehicle comprising:
a door or a tailgate;
an access system; and
an apparatus, which comprises:
a camera arrangement mountable or mounted on a motor vehicle, wherein the camera arrangement is configured to detect at least one foot of a person approaching the motor vehicle or of a person located at the motor vehicle;
a computer mountable or mounted on the motor vehicle and coupled to the camera arrangement, wherein the computer is configured to
determine an orientation of the at least one foot detected by the camera arrangement;
determine, based on the determined orientation, a line of sight of the person;
control the access system, which is configured to lock and unlock or automatically actuating a tailgate or door of the motor vehicle, to unlock the tailgate or the door of the motor vehicle when the determined line of sight is directed towards the tailgate or the door or control the access system to automatically actuate the tailgate or the door to open when the determined line of sight is directed towards the tailgate or door; and
control the access system to lock the tailgate or the door when the determined line of sight is not directed towards the tailgate or the door or control the access system to automatically actuating the tailgate or the door to close when the determined line of sight is not directed towards the tailgate or the door, wherein the determined line of sight is classified using an at least two-class classification circle travelling in real time with the person, wherein the classification circle is divided into a first class range facing towards the tailgate or the door of the motor vehicle, and a second class range facing away in relation to the tailgate or the door of the motor vehicle, wherein the access system unlocks the tailgate or door of the motor vehicle when the determined line of sight is inside the first class range of the classification circle or the access system automatically actuates the tailgate or the door to open when the determined line of sight is inside the first class range of the classification circle, and wherein the access system locks the tailgate or the door when the determined line of sight is inside the second class range of the classification circle or the access system automatically actuates the tailgate or door to close when the determined line of sight is inside the second class range of the classification circle.

2. An apparatus for a motor vehicle, comprising:

a camera arrangement mountable or mounted on a motor vehicle, wherein the camera arrangement is configured to detect at least one foot of a person approaching the motor vehicle or of a person located at the motor vehicle;

a computer mountable or mounted on the motor vehicle and coupled to the camera arrangement, wherein the computer is configured to determine an orientation of the at least one foot detected by the camera arrangement;

determine, based on the determined orientation, a line of sight of the person;

control an access system, which is configured to lock and unlock or automatically actuating a tailgate or door of the motor vehicle, to unlock the tailgate or the door of the motor vehicle when the determined line of sight is directed towards the tailgate or the door or control the access system to automatically actuate the tailgate or the door to open when the determined line of sight is directed towards the tailgate or door; and control the access system to lock the tailgate or the door when the determined line of sight is not directed towards the tailgate or the door or control the access system to automatically actuating the tailgate or the door to close when the determined line of sight is not directed towards the tailgate or the door, wherein the determined line of sight is classified using an at least two-class classification circle travelling in real time with the person, wherein the classification circle is divided into a first class range facing towards the tailgate or the door of the motor vehicle, and a second class range facing away in relation to the tailgate or the door of the motor vehicle, wherein the access system unlocks the tailgate or door of the motor vehicle when the determined line of sight is inside the first class range of the classification circle or the access system automatically actuates the tailgate or the door to open when the determined line of sight is inside the first class range of the classification circle, and wherein the access system locks the tailgate or the door when the determined line of sight is inside the second class range of the classification circle or the access system automatically actuates the tailgate or door to close when the determined line of sight is inside the second class range of the classification circle.

3. The apparatus of claim 2, wherein the camera arrangement is at least one all-around visibility camera mountable or mounted on the motor vehicle, or four all-around visibility cameras are arranged on the motor vehicle.

4. The apparatus of claim 3, wherein at least one all-round visibility camera is aligned so that a field of vision center axis passing centrally through a field of vision of the at least one all-around visibility camera is aligned diagonally with respect to a central longitudinal axis of the motor vehicle and in a direction towards a ground on which the motor vehicle is arranged.

5. A method for actuating an access system of a motor vehicle, the method comprising:

detecting, by a camera arrangement of the motor vehicle, at least one foot of a person approaching the motor vehicle or of a person located at the motor vehicle;

determining an orientation of the at least one foot detected by the camera arrangement;

determining, based on the determined orientation, a line of sight of the person;

unlocking, by an access system for locking and unlocking or automatically actuating a tailgate or door of the motor vehicle, the tailgate or the door of the motor vehicle when the determined line of sight is directed towards the tailgate or the door or automatically actuating, by the access system, the tailgate or the door to open when the determined line of sight is directed towards the tailgate or door; and locking, by the access system, the tailgate or the door when the determined line of sight is not directed towards the tailgate or the door or automatically actuating the tailgate or the door to close when the determined line of sight is not directed towards the tailgate or the door, wherein the determined line of sight is classified using an at least two-class classification circle travelling in real time with the person, wherein the classification circle is divided into a first class range facing towards the tailgate or the door of the motor vehicle, and a second class range facing away in relation to the tailgate or the door of the motor vehicle, wherein the access system unlocks the tailgate or door of the motor vehicle when the determined line of sight is inside the first class range of the classification circle or the access system automatically actuates the tailgate or the door to open when the determined line of sight is inside the first class range of the classification circle, and wherein the access system locks the tailgate or the door when the determined line of sight is inside the second class range of the classification circle or the access system automatically actuates the tailgate or door to close when the determined line of sight is inside the second class range of the classification circle.

6. The method of claim 5, wherein the determining of the orientation of the at least one foot detected by the camera arrangement involves determining an orientation of a toe of the foot.

7. The method of claim 6, wherein the determined line of sight is aligned parallel to a toe vector extending at least through the determined toe of the foot.

8. The method of claim 5, wherein
the first class range spans an angle of at least 10° to a maximum of 180°, and
the second class range spans an opposite angle, which is complementary in relation to the angle spanned by the first class range or the second class range, viewed in a horizontal pane, spans an angle of at least 180° to at most 350°.

9. The method of claim 5, wherein
a computer of the motor vehicle determines the orientation and the line of sight, or
the orientation and the line of sight are determined using computer-based vision, machine vision, or algorithms for detecting and measuring geometric structures of objects and movements of the objects.

10. The method of claim 9, wherein
software executed by the computer or the algorithms for detecting and measuring geometric structures of objects and movements of the objects are trained by ground truth data or by machine learning methods, or
the ground truth data is determined during learning runs of the method on the motor vehicle.

11. The method of claim 10, wherein after detecting the ground truth data in the course of an adaptation process, the ground truth data is revised, and wherein the detected ground truth data is expanded manually with attributes of the person.

\* \* \* \* \*